(12) United States Patent
Hung et al.

(10) Patent No.: US 11,703,077 B1
(45) Date of Patent: Jul. 18, 2023

(54) CARABINER

(71) Applicant: YOKE INDUSTRIAL CORP., Taichung (TW)

(72) Inventors: Wei-Chieh Hung, Taichung (TW); Chia-Hsien Wang, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 17/869,747

(22) Filed: Jul. 20, 2022

(51) Int. Cl.
*F16B 45/02* (2006.01)

(52) U.S. Cl.
CPC ................... *F16B 45/029* (2021.05)

(58) Field of Classification Search
CPC ..................................................... F16B 45/029
See application file for complete search history.

(56) References Cited

U.S. PATENT DOCUMENTS

| | | | |
|---|---|---|---|
| 10,363,442 B2 * | 7/2019 | Kekahuna | A63B 27/00 |
| 10,384,086 B2 * | 8/2019 | Kekahuna | F16B 45/02 |
| 11,305,968 B1 * | 4/2022 | Maness | B66C 1/36 |
| 2015/0231423 A1 * | 8/2015 | Perner | A62B 35/0037 24/518 |
| 2018/0345056 A1 * | 12/2018 | Kekahuna | A63B 27/00 |
| 2021/0181535 A1 * | 6/2021 | Manin | G02C 11/00 |

* cited by examiner

Primary Examiner — David M Upchurch
(74) Attorney, Agent, or Firm — Apex Juris, PLLC; Tracy Heims; R Wylie

(57) ABSTRACT

A carabiner includes a retaining frame, wherein each of two opposite sides of the retaining frame has a pivotally connecting portion and an inserting tube, respectively. The inserting tube has an inserted hole inside and is fitted around by a socket portion of a hook-shaped tube of the hook member. A wire rope passes through the hook-shaped tube. A bottom end of the wire rope is inserted into the inserted hole. A nose is engaged with a free end of the hook-shaped tube and a free end of the wire rope. A portion, where the socket portion, the inserting tube, and the wire rope are overlapped, is compressed to fix. The pivotally connecting portion is pivotally connected to a gate member. A top end of the gate member is detachably hooked to the nose. With such design, the weight of the carabiner could be reduced without worsening the safety.

8 Claims, 10 Drawing Sheets

CARABINER

BACKGROUND OF THE INVENTION

Technical Field

The present invention relates generally to a hook structure, and more particularly to a carabiner for connecting wire ropes.

Description of Related Art

A main body of a conventional carabiner is made of metal and is solid. The solid metal could ensure the carabiner is strong enough to keep safety, so that a weight of the conventional carabiner is hard to reduce and to ensure the strength of the carabiner at the same time. However, for convenience of use, the carabiner needs to be light. Therefore, the conventional carabiner has room for improvement.

BRIEF SUMMARY OF THE INVENTION

In view of the above, the primary objective of the present invention is to provide a carabiner, including a hook member that includes a tube body and a wire rope, so that a weight of the carabiner could be reduced without affecting the safety of the carabiner. Additionally, the carabiner provided in the present invention could be manufactured fast.

The present inventive subject matter provides a carabiner, including a retaining frame, a hook member, and a gate member. The retaining frame has a main body, wherein each of two opposite sides of the main body has a pivotally connecting portion and an inserting tube, respectively. The inserting tube has an inserted hole inside. The hook member includes a hook-shaped tube, a wire rope, and a nose, wherein a bottom end of the hook-shaped tube has a socket portion that has a diameter greater than a diameter of other portion of the hook-shaped tube. The socket portion fits around the inserting tube. The wire rope passes through the hook-shaped tube. A bottom end of the wire rope is inserted into the inserted hole. A portion, where the socket portion, the inserting tube, and the wire rope are overlapped, is compressed to fix. The nose is fixed to a free end of the hook-shaped tube and is engaged with a free end of the wire rope. An opening is formed between the nose and the pivotally connecting portion. The gate member has two ends. One end of the gate member is pivotally connected to the pivotally connecting portion, and the other end of the gate member is detachably engaged with the nose. The gate member is controllable to engage with or disengage from the nose, thereby manipulating the opening to open or close.

Since the hook member is constituted by the hook-shaped tube and the wire rope, the weight of the carabiner could be reduced. Additionally, the hook member is engaged with the retaining frame by simply compressing, so that the manufacturing process of the carabiner does not need the welding process, thereby increasing the efficiency and reducing the manufacturing cost. When the hook-shaped tube of the hook member is deformed due to the external force, the wire rope, which is fixed to the nose and the inserting tube, could support the hook-shaped tube to increase the deformation resistance and the stiffness of the hook member, thereby enhancing the strength of the carabiner and ensuring the safety of the carabiner

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As illustrated in FIG. 1 to FIG. 5, a carabiner 100 of an embodiment according to the present invention includes a retaining frame 10, a hook member 20, and a gate member 30, wherein the hook member 20 and the gate member 30 are engaged with the retaining frame 10.

Figure 1:
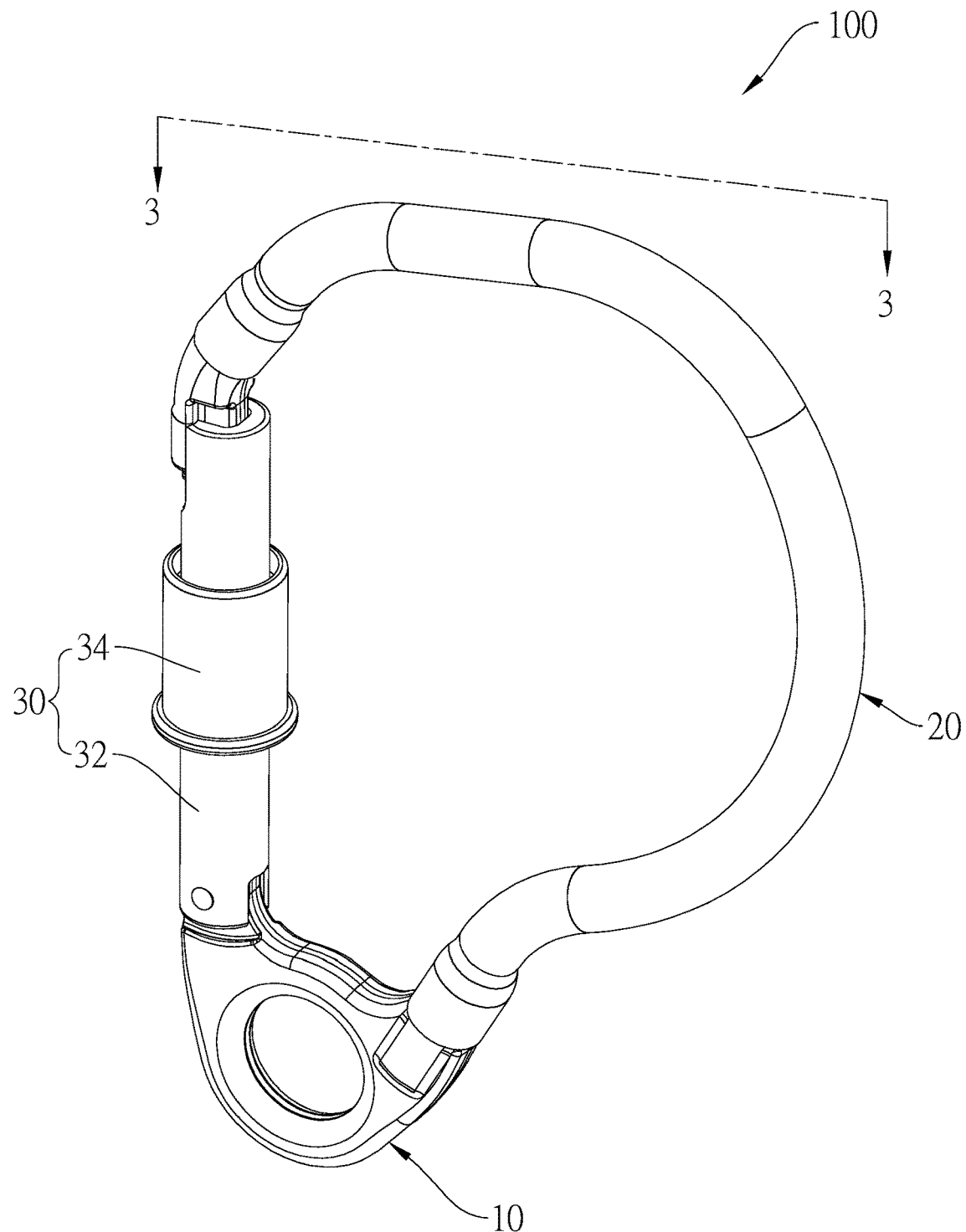
FIG. 1 is a perspective view of the carabiner of an embodiment according to the present invention.
Figure 2:
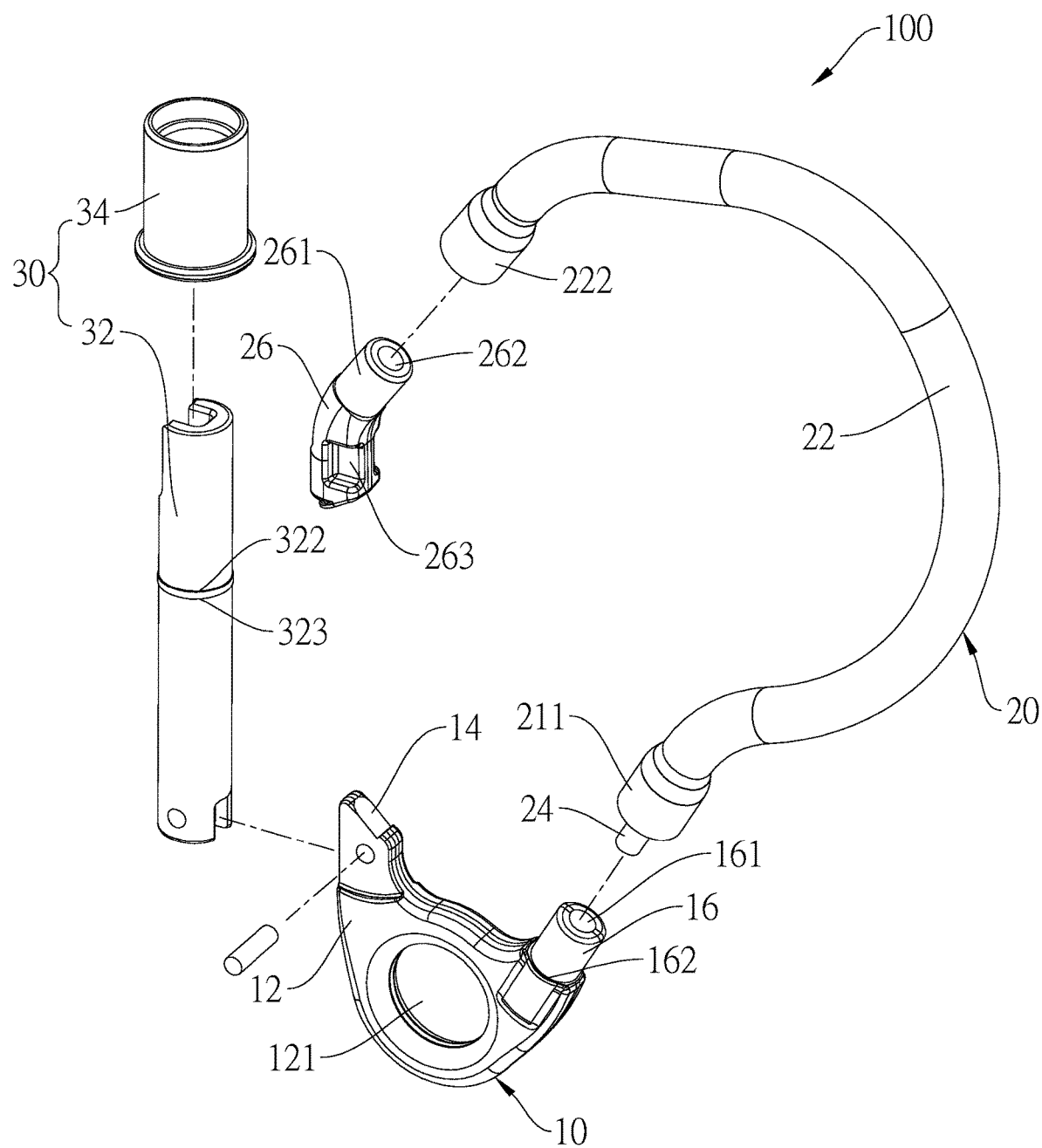
FIG. 2 is an exploded view of the carabiner of the embodiment according to the present invention.

As illustrated in FIG. 2, the retaining frame 10 has a main body 12, wherein the main body 12 is a metal plate and has a perforation 121 that is located in a middle of the metal plate. Each of two opposite sides of a top portion of the main body 12 has a pivotally connecting portion 14 and an inserting tube 16, respectively. The inserting tube 16 is a tube body extending upwardly (i.e. in a direction away from the perforation 121) and has an inserted hole 161 inside. In the current embodiment, the inserted hole 161 is an axial hole of the inserting tube 16.

The hook member 20 includes a hook-shaped tube 22, a wire rope 24, and a nose 26. The hook-shaped tube 22 is a tube body that is curved to form a hook shape, wherein two ends of the hook-shaped tube 22 are defined as a bottom end and a free end, respectively. The bottom end of the hook-shaped tube 22 has a socket portion 221, wherein an outer diameter of the socket portion 221 is greater than that of other portion of the hook-shaped tube 22, and an inner diameter of the socket portion 221 is greater than that of other portion of the hook-shaped tube 22. The socket portion 221 fits around the inserting tube 16. The wire rope 24 passes through the hook-shaped tube 22, wherein two ends of the wire rope 24 are defined as a bottom end and a free end, respectively. The bottom end of the wire rope 24 is inserted into the inserted hole 161 of the inserting tube 16. By pressing a portion where the socket portion 221, the inserting tube 16, and the wire rope 24 are overlapped via a mold, the socket portion 221, the inserting tube 16, and the wire rope 24 are compressed to deform (i.e. the diameters of the components are reduced), so that the hook-shaped tube 22 and the wire rope 24 are fixedly engaged with the inserting tube 16 of the retaining frame 10. The nose 26 is fixed at the free end of the hook-shaped tube 22, and the free end of the wire rope 24 is engaged with the nose 26. An opening A is formed between the nose 26 and the pivotally connecting portion 14.

The gate member 30 has two ends. One of two ends of the gate member 30 is pivotally connected to the pivotally connecting portion 14, and the other of two ends of the gate member 30 is detachably engaged with the nose 26, so that the gate member 30 could be controlled to engage with or disengage from the nose 26, thereby manipulating the opening A to open or close.

When the carabiner 100 of the current embodiment is used, a wire rope passes through the perforation 121 of the retaining frame 10, and the gate member 30 of the carabiner 100 could be pushed to open the opening A for hooking. After the hook member 20 hooks to a desired fixed site, the gate member 30 is moved back to engage with the nose 26, thereby mounting the carabiner 100 to the desired fixed site. In the current embodiment, the hook member 20 of the carabiner 100 is not solid metal. Instead, the hook member 20 includes the hook-shaped tube 22, the wire rope 24 passing through the hook-shaped tube 22, and the nose 26 engaged with the free end of the free end, so that a weight of the hook member 20 is smaller than a weight of the solid metal hook, thereby reducing an entire weight of the carabiner 100. Additionally, the combination between the hook member 20 and the retaining frame 10 is processed by a means of compressing to reduce the diameter of a portion of the carabiner 100 (i.e. a portion, where the hook-shaped tube 22, the inserting tube 16, and the wire rope 24 are overlapped), so that a welding process that needs to be operated by a skilled technician could be avoided, thereby increasing the efficiency of the manufacture and reducing the cost of the manufacture.

Additionally, although the weight of the carabiner 100 is reduced, the strength of the carabiner 100 is strong enough to keep the carabiner 100 safe for use. In the current embodiment, the bottom end of the wire rope 24 is compressedly engaged with the retaining frame 10, and the nose 26 that is connected to the free end of the wire rope 24 is detachably hooked by the gate member 30 that is engaged with the retaining frame 10. Since the inserting tube 16 and the nose 26 hooked by the gate member 30 are respectively fixed two ends of the wire rope 24, the wire rope 24 could provide a strength to support the hook-shaped tube 22 when an external force is exerted on the hook member 20 to deform the hook-shaped tube 22, thereby increasing the deformation resistance and the stiffness of the hook member 20 to ensure the safety of the carabiner 100.

As illustrated in FIG. 1 to FIG. 5, a protruding flange 162 is formed between an outer circumference of the inserting tube 16 and a surface of the main body 12. The protruding flange 162 surrounds a bottom edge of the outer circumference of the inserting tube 16. When the socket portion 221 of the hook-shaped tube 22 fits around the inserting tube 16, the inserting tube 16 is plugged into the socket portion 221 until a bottom edge of the socket portion 221 abuts against the protruding flange 162. The free end of the hook-shaped tube 22 has an external tube portion 222, wherein an outer diameter of the external tube portion 222 is greater than that of other portion of the hook-shaped tube 22 (i.e. other portion of the hook-shaped tube 22 means a middle portion of the hook-shaped tube 22, excluding the socket portion 221 and the external tube portion 222), and an inner diameter of the socket portion 221 is greater than that of other portion of the hook-shaped tube 22 (i.e. other portion of the hook-shaped tube 22 means a middle portion of the hook-shaped tube 22, excluding the socket portion 221 and the external tube portion 222). The nose 26 has a plugging tube 261 that has a plugged hole 262 inside. In the current embodiment, the plugged hole 262 is an axial hole of the plugging tube 261. The plugging tube 261 of the nose 26 is inserted into the external tube portion 222, and the free end of the wire rope 24 is inserted into the plugged hole 262. By pressing a portion, where the external tube portion 222, the plugging tube 261, and the wire rope 24 are overlapped, via a mold, the external tube portion 222, the plugging tube 261, and the wire rope 24 are compressed to be deformed (i.e. the diameters of the components are reduced) to fix the nose 26 to the hook-shaped tube 22. A free end of the nose 26, which is opposite to an end of the nose 26 having the plugging tube 261, has a locking latch 263.

Figure 6A:
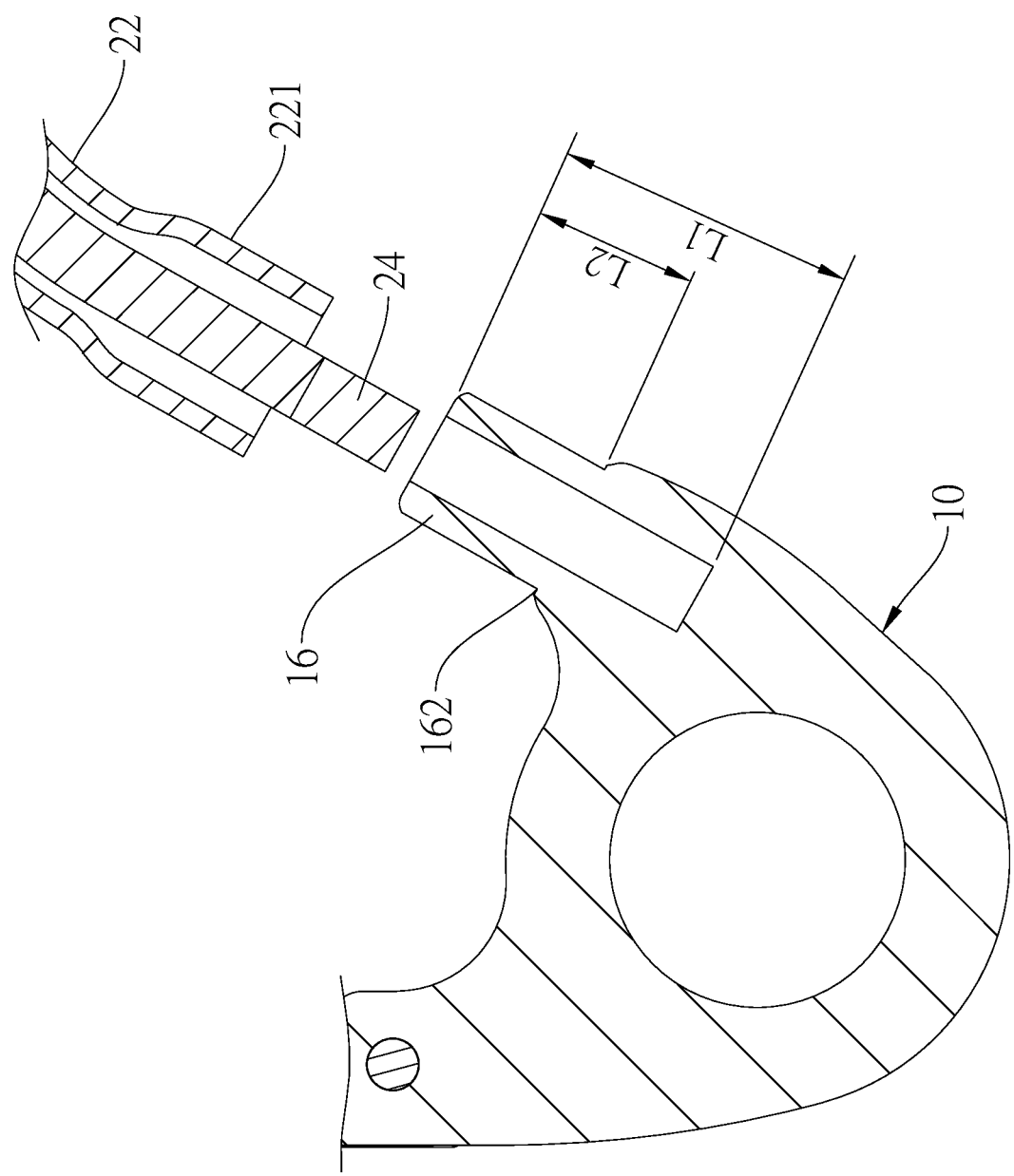
FIG. 6A is a schematic view, showing the hook member is about to be engaged with the inserting tube.
Figure 6B:
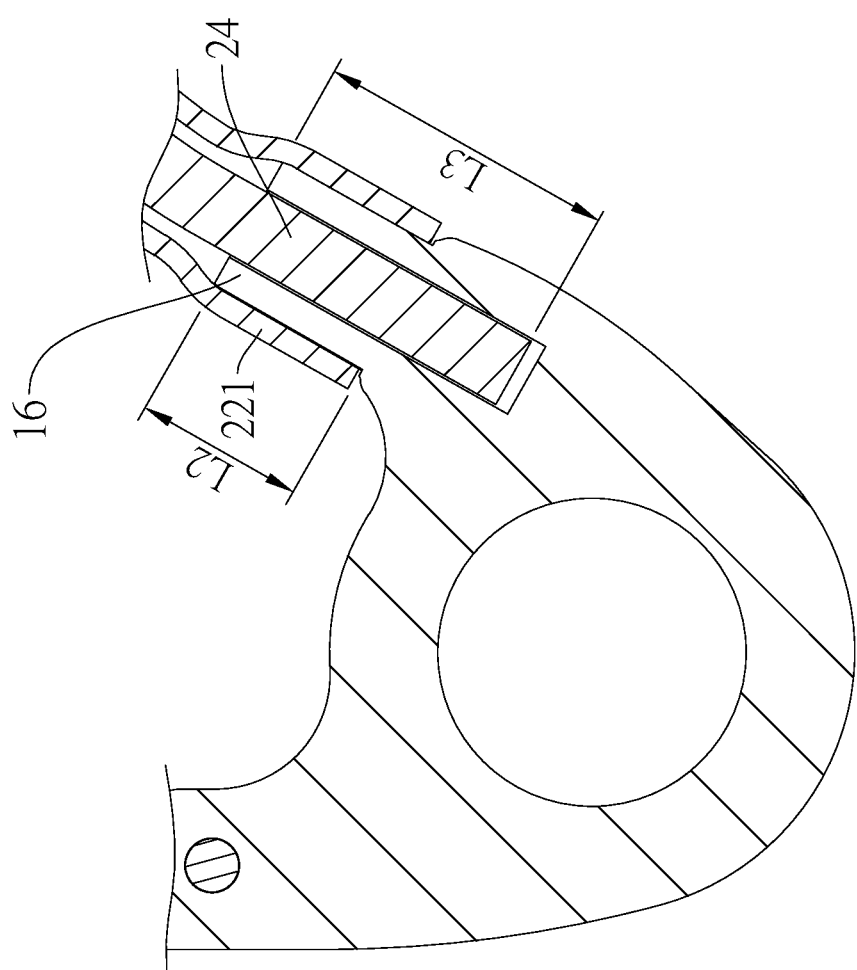
FIG. 6B is a schematic view, showing the hook member is engaged with the inserting tube.

As illustrated in FIG. 6A, the inserted hole 161 has a depth L1 along an axial direction of the inserting tube 16, wherein the depth L1 of the inserted hole 161 is defined as a minimum distance between a top edge of the inserting tube 16 and a bottom of the inserted hole 161. The inserting tube 16 has a length L2 in the axial direction of the inserting tube 16, which is defined as a minimum distance between the top edge of the inserting tube 16 and the protruding flange 162. In the current embodiment, the depth L1 of the inserted hole 161 is greater than the length L2 of the inserting tube 16, so that the inserted hole 161 has a depth L1 that is long enough to receive a portion of the wire rope 24 that has a length greater than the length L2 of the inserting tube 16. As illustrated in FIG. 6B, when the wire rope 24 is inserted into the inserted hole 161, a portion of the wire rope 24 that is in the inserted hole 161 has a length L3, wherein the length L3 of the wire rope 24 is greater than or equal to the length L2 of the inserting tube 16. With such design, when the inserted tube 16 is inserted into the socket portion 222, a length of a portion, where the socket portion 221, the inserting tube 16, and the wire rope 24 are overlapped, could be maximum.

Figure 7A:
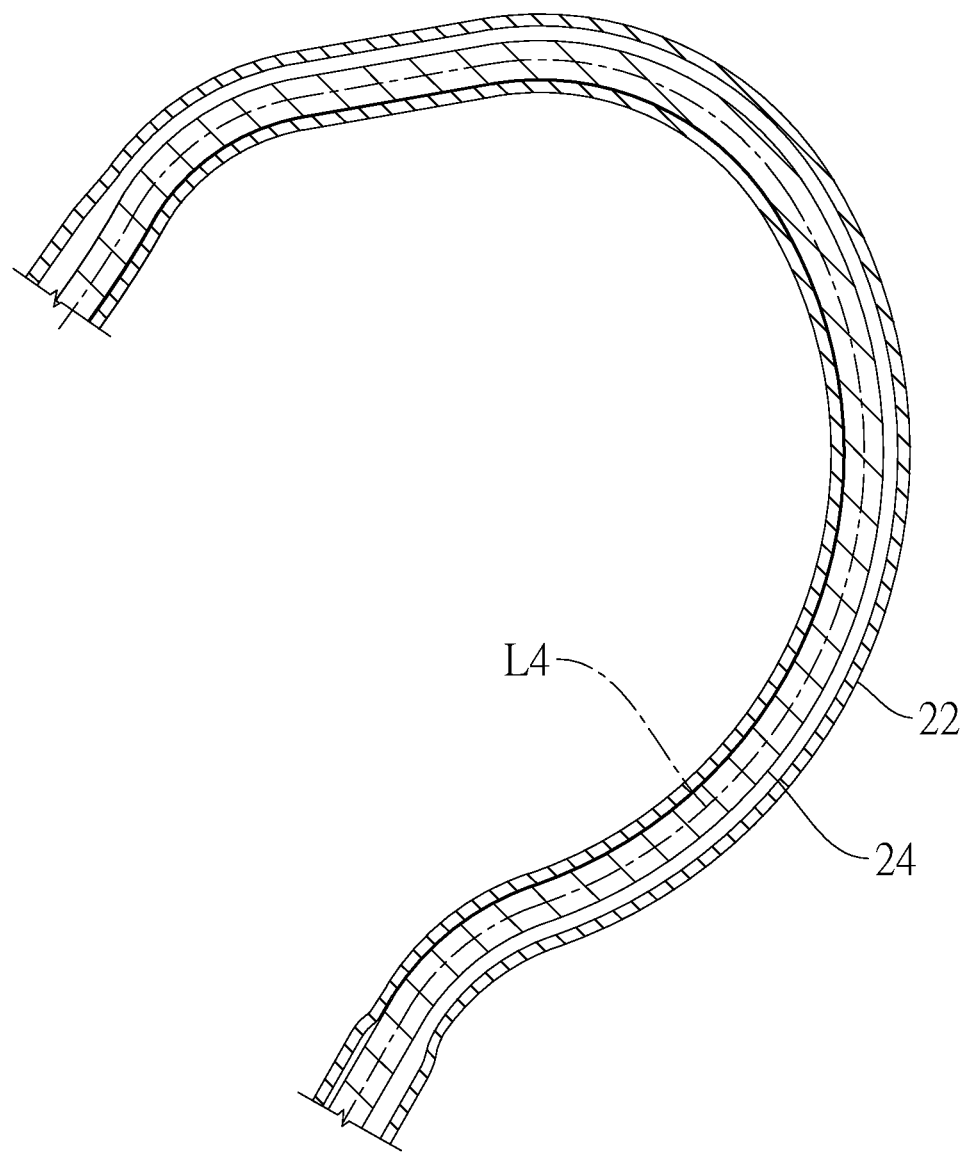
FIG. 7A is a schematic view, showing the wire rope passes through the hook-shaped tube and is aligned with the inner side of the hook-shaped tube.
Figure 7B:
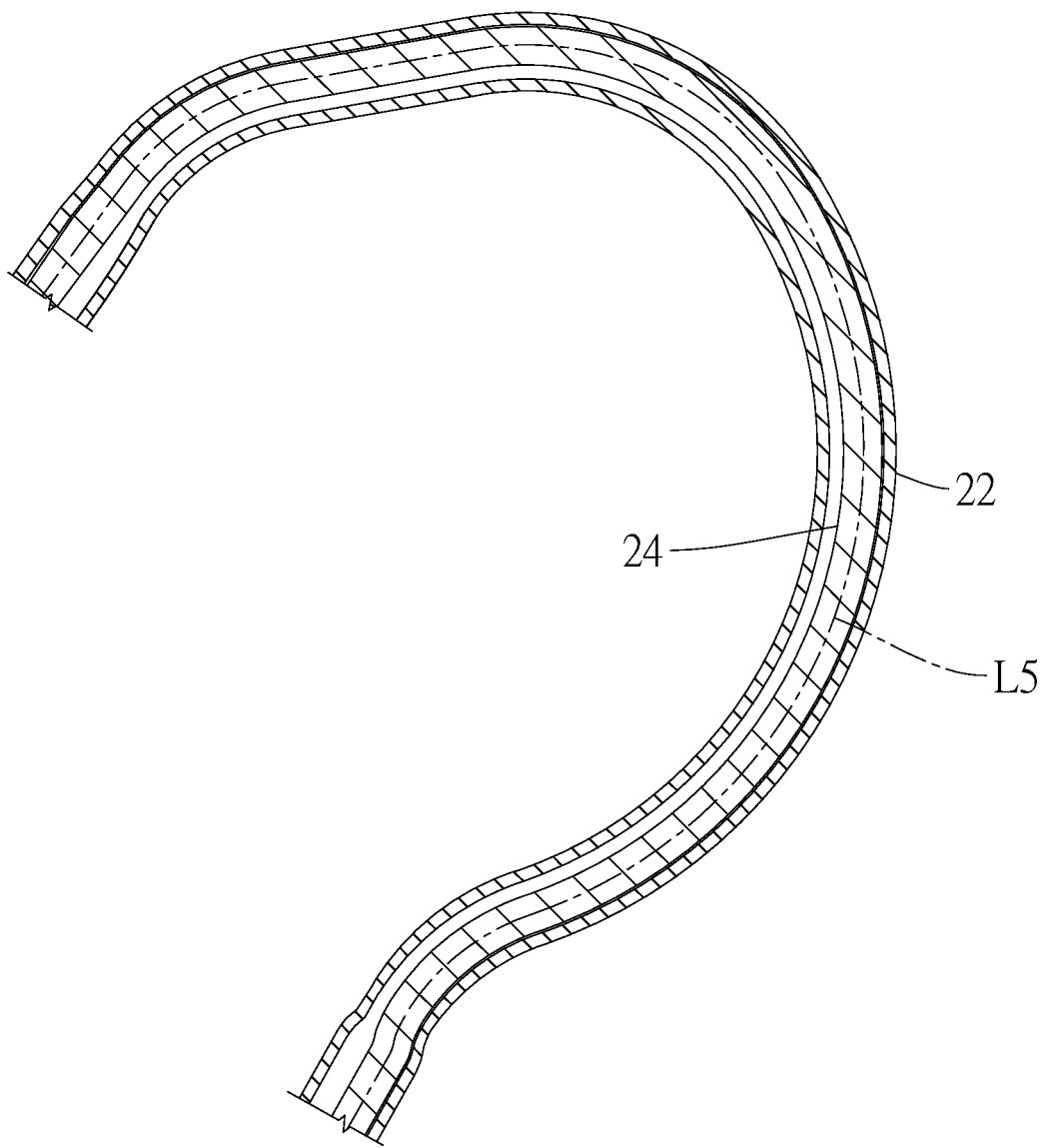
FIG. 7B is a schematic view, showing the wire rope passes through the hook-shaped tube and is aligned with the outer side of the hook-shaped tube.

As illustrated in FIG. 7A, FIG. 7B, and FIG. 6A, in the current embodiment, the inner diameter of the hook-shaped tube 22 is greater than a diameter of the wire rope 24. An inner side of the hook-shaped tube 22 is a side of the hook-shaped tube 22 that faces to (or close to) the pivotally connecting portion 14, and an outer side of the hook-shaped tube 22 is another side of the hook-shaped tube 22 that is back to the pivotally connecting portion 14. When the wire rope 24 passes through the hook-shaped tube 22 and abuts against the inner side of the hook-shaped tube 22, a portion of the wire rope 24 located in the hook-shaped tube 22 has a length L4. When the wire rope 24 passes through the hook-shaped tube 22 and abuts against the outer side of the hook-shaped tube 22, a portion of the wire rope 24 located in the hook-shaped tube 22 has a length L5. A difference between the length L4 of the wire rope 24 abutting against the inner side of the hook-shaped tube 22 and the length L5 of the wire rope 24 abutting against the outer side of the hook-shaped tube 22 is smaller than or equal to a difference between the depth L1 of the inserted hole 161 and the length L2 of the inserting tube 16. In the current embodiment, a ratio of the difference between the depth L1 of the inserted hole 161 and the length L2 of the inserting tube 16 to the depth L1 of the inserted hole 161 is in a range of 0.3 to 0.6.

As illustrated in FIG. 6B, after the nose 26 is engaged with the hook member 20 and is connected to the free end of the wire rope 24, a length of a portion of the wire rope 24 that passes through out the socket portion 221 is defined as a bias value of the wire rope 24. In the current embodiment, the bias value of the wire rope 24 is smaller than or equal to the difference between the length L4 of the wire rope 24 abutting against the inner side of the hook-shaped tube 22 and the length L5 of the wire rope 24 abutting against the outer side of the hook-shaped tube 22. However, in other embodiment, the bias value of the wire rope 24 could merely be smaller than or equal to the difference between the depth L1 of the inserted hole 161 and the length L2 of the inserting tube 16. With such design, when the hook member 20 is plugged by the inserting tube 16 of the retaining frame 10, the length L3 of the portion of the wire rope 24 that is inserted into the inserted hole 161 could be long enough to form a portion where the socket portion 221, the inserting tube 16, and the wire rope 24 are overlapped, thereby facilitating the compressedly engagement between the hook member 20 and the retaining frame 10 and increasing the strength of the compressedly engagement. In other words, the problem that the wire rope 24 in the inserted hole 161 is too short to be compressed with the inserting tube 16 and the socket portion 221 could be prevented.

The engagement between the nose 26 and the hook-shaped tube 22 is identical to the engagement between the retaining frame 10 and the hook-shaped tube 22. Besides, the engagement between the nose 26 and the wire rope 24 is identical to the engagement between the retaining frame 10 and the wire rope 24. When a depth of the plugged hole 262 is greater than a length of the plugging tube 261, and a length of the portion of the wire rope 24 in the plugged hole 262 is greater than the length of the plugging tube 261, a length of a portion, where the external tube portion 222, the plugging tube 261, and the wire rope 24 are overlapped, could be maximum.

Figure 3:
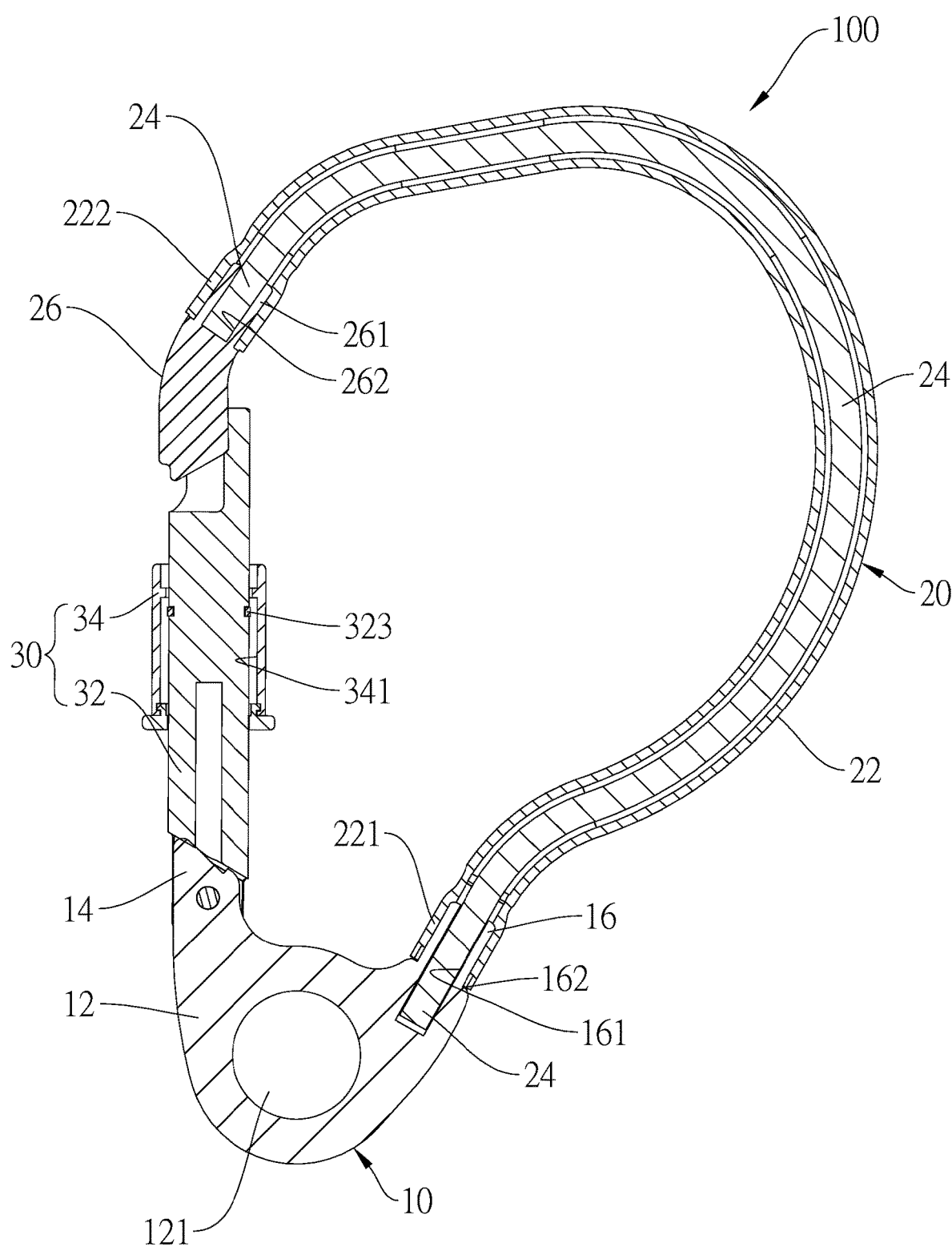
FIG. 3 is a sectional view taken along 3-3 line in FIG. 1.
Figure 4:
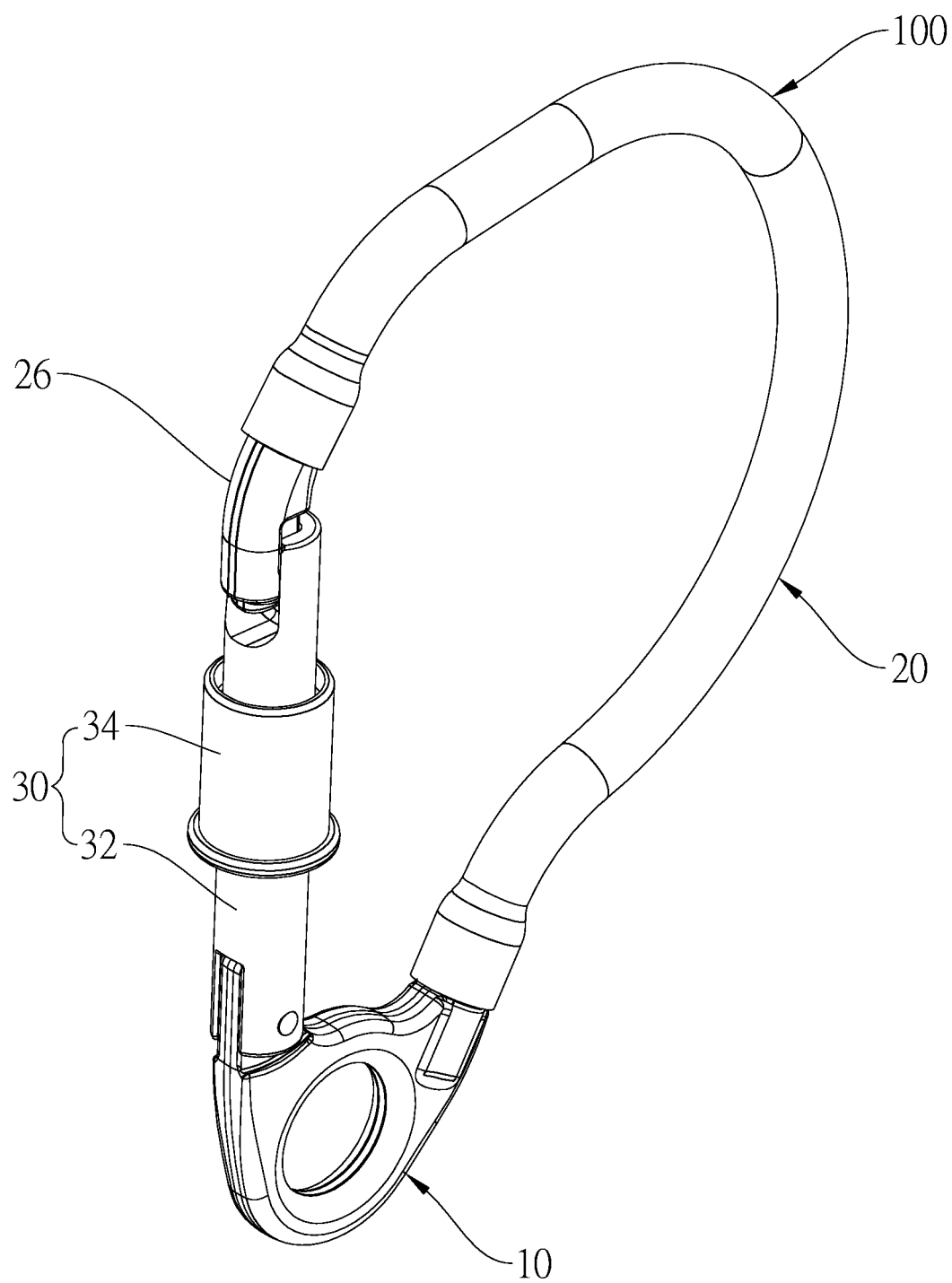
FIG. 4 is a perspective view of the carabiner in FIG. 1 seen from another perspective.
Figure 5:
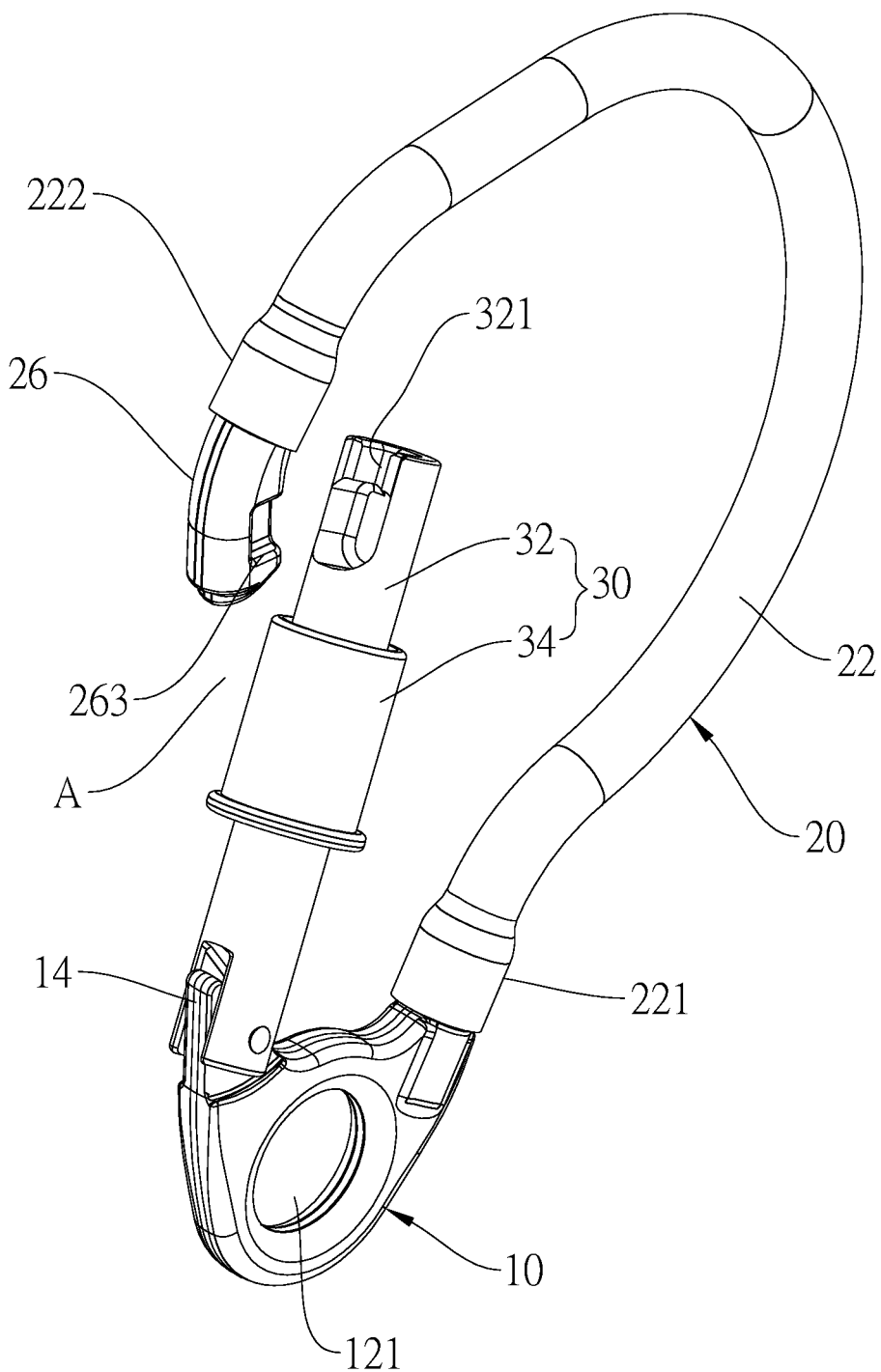
FIG. 5 is a perspective view of the carabiner in FIG. 5, showing the gate of the carabiner is opened.
Figure 8:
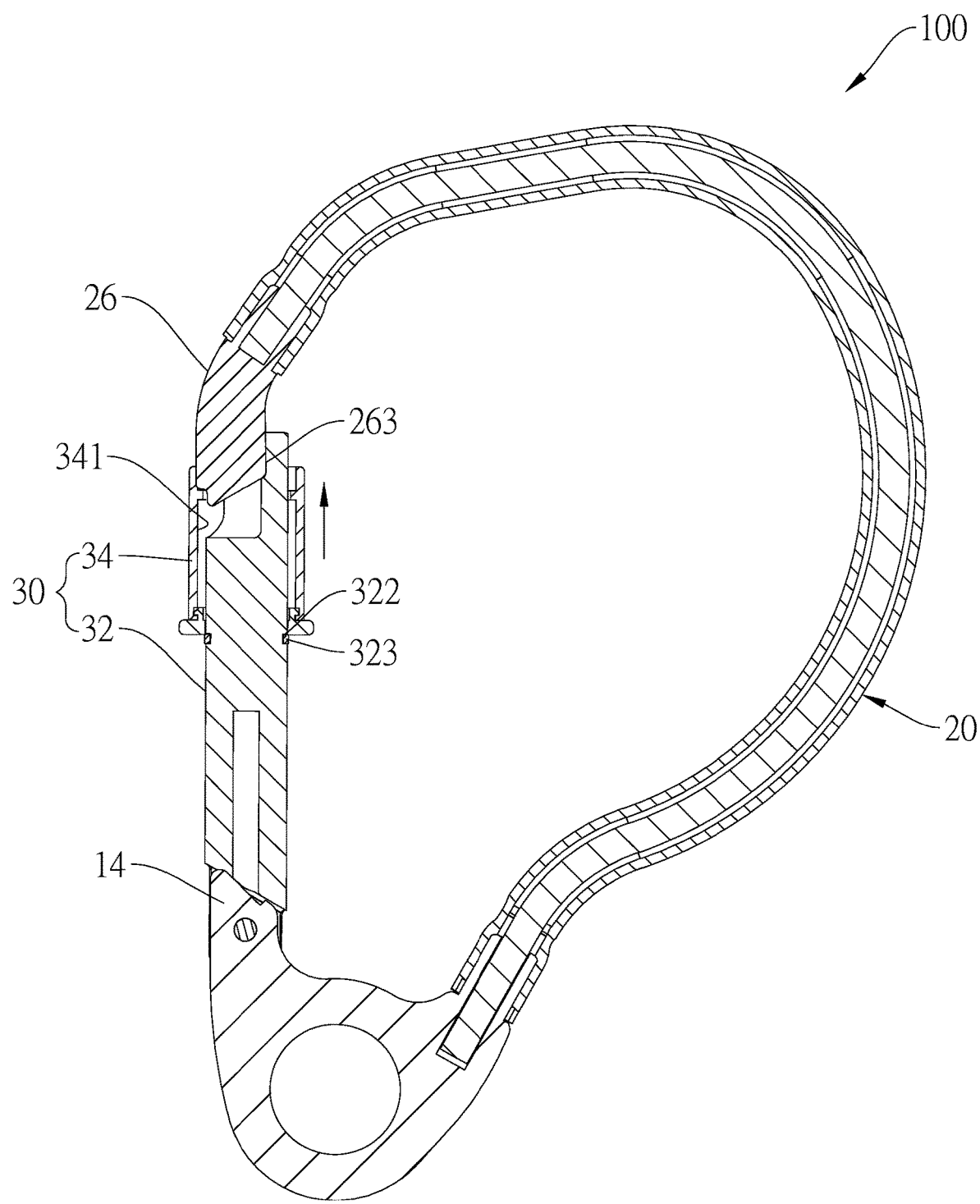
FIG. 8 is a schematic view, showing the gate is locked with the nose.

As illustrated in FIG. 3, FIG. 5, and FIG. 8, the gate member 30 has a rod body 32, wherein an end of the rod body 32 is pivotally connected to the pivotally connecting portion 14, and another end of the rod body 32 forms a notch 321. The notch 321 of the rod body 32 could be engaged with the locking latch 263 in a direction from the inserting tube 16 to the pivotally connecting portion 14 of the retaining frame 10 (i.e. a direction from an interior to an exterior of the carabiner 100). A circumference of the rod body 32 is disposed with an annular groove 322, wherein an elastic ring 323 is disposed in the annular groove 322. The rod body 32 is fitted around by a sleeve 34, wherein the sleeve 34 is adapted to fit around a portion, where the notch 321 is engaged with the locking latch 263, to fix or lock the engagement between the gate member 30 and the nose 26 of the hook member 20. When the sleeve 34 is moved along the hook-shaped tube 22 to a locking position to fit around the portion, where the notch 321 is engaged with the locking latch 263, the elastic ring 323 urges against a bottom edge of the sleeve 34 to restrict the sleeve 34 from sliding away from the locking position (i.e. prevent the sleeve 34 from sliding down along the rod body 32). An inner circumference of the sleeve 34 has a receiving groove 341. When the user exerts force to move the sleeve 34 downward, the elastic ring 323 is compressed to be inserted into the sleeve 34 through the bottom edge of the sleeve 34, and then the elastic ring 323 is moved to be located into the receiving groove 341 of the sleeve 34. The receiving groove 341 and the elastic ring 323 could restrict the movement of the sleeve 34 along the rod body 32.

Except for the aforementioned embodiment, the sleeve 34 could be replaced with a torsion spring that is disposed between the rod body 32 and the pivotally connecting portion 14, thereby keeping the notch 321 of the rod body 32 being engaged with the locking latch 263 of the nose 26 to close the opening A. When the rod body 32 is pressed by an external force to move toward the socket portion 221 of the hook-shaped tube 22, the opening A could be opened. The structure of the gate member 30 is not limited to the structure described above, as long as the structure of the gate member 30 allows the notch 321 of the rod body 32 could be engaged with the locking latch 263 in the direction from the inserting tube 16 to the pivotally connecting portion 14 of the retaining frame 10.

It must be pointed out that the embodiment described above is only a preferred embodiment of the present invention. All equivalent structures which employ the concepts disclosed in this specification and the appended claims should fall within the scope of the present invention.

What is claimed is:

1. A carabiner, comprising:
    a retaining frame having a main body, wherein each of two opposite sides of the main body has a pivotally connecting portion and an inserting tube, respectively; the inserting tube has an inserted hole inside;
    a hook member comprising a hook-shaped tube, a wire rope, and a nose, wherein a bottom end of the hook-shaped tube has a socket portion that has a diameter greater than a diameter of other portion of the hook-shaped tube; the socket portion fits around the inserting tube; the wire rope passes through the hook-shaped tube; a bottom end of the wire rope is inserted into the inserted hole; a portion, where the socket portion, the inserting tube, and the wire rope are overlapped, is compressed to fix; the nose is fixed to a free end of the hook-shaped tube and is engaged with a free end of the wire rope; an opening is formed between the nose and the pivotally connecting portion; and
    a gate member having two ends, wherein one of the two ends of the gate member is pivotally connected to the pivotally connecting portion, and the other of the two ends of the gate member is detachably engaged with the nose, so that the gate member is controllable to engage with or disengage from the nose, thereby manipulating the opening to open or close.

2. The carabiner as claimed in claim 1, wherein the retaining frame has a protruding flange that is formed between an outer circumference of the inserting tube and a surface of the main body; a bottom edge of the socket portion abuts against the protruding flange; the inserted hole has a depth along an axial direction of the inserting tube, and the inserting tube has a length in the axial direction of the inserting tube; the length of the inserting tube is defined as a minimum distance between a top edge of the inserting tube and the protruding flange; the depth of the inserted hole is greater than the length of the inserting tube.

3. The carabiner as claimed in claim 2, wherein a portion of the wire rope that is in the inserted hole has a length that is greater than the length of the inserting tube.

4. The carabiner as claimed in claim 3, wherein an inner diameter of the hook-shaped tube is greater than a diameter of the wire rope; when the wire rope passes through the hook-shaped tube and abuts against an inner side of the hook-shaped tube, a portion of the wire rope located in the hook-shaped tube has a length; when the wire rope passes through the hook-shaped tube and abuts against an outer side of the hook-shaped tube, a portion of the wire rope located in the hook-shaped tube has a length; a difference between the length of the wire rope abutting against the inner side of the hook-shaped tube and the length of the wire rope abutting against the outer side of the hook-shaped tube is smaller than or equal to a difference between the depth of the inserted hole and the length of the inserting tube.

5. The carabiner as claimed in claim 4, wherein a ratio of the difference between the depth of the inserted hole and the length of the inserting tube to the depth of the inserted hole is in a range of 0.3 to 0.6.

6. The carabiner as claimed in claim 1, wherein a free end of the hook-shaped tube has an external tube portion, wherein a diameter of the external tube portion is greater than a diameter of other portion of the hook-shaped tube excluding the socket portion and the external tube portion; the nose has a plugging tube; the plugging tube of the nose is inserted into the external tube portion and has a plugged hole inside; a free end of the wire rope is inserted into the plugged hole; a portion, where the external tube portion, the plugging tube, and the wire rope are overlapped, is compressed to fix.

7. The carabiner as claimed in claim 1, wherein a free end of the nose has a locking latch, and the gate member has a rod body; an end of the rod body is pivotally connected to the pivotally connecting portion, and another end of the rod body forms a notch; the notch of the rod body is engaged with the locking latch in a direction from an interior to an exterior of the carabiner.

8. The carabiner as claimed in claim 7, wherein rod body is fitted around by a sleeve;

the sleeve is adapted to fit around a portion, where the notch is engaged with the locking latch to fix the engagement between the gate member and the nose of the hook member; a circumference of the rod body has an annular groove, and an elastic ring is disposed in the annular groove; when the sleeve is located at the portion, where the notch is engaged with the locking latch, the elastic ring urges against a bottom edge of the sleeve to position the sleeve.

\* \* \* \* \*